(12) United States Patent
Vogelmann et al.

(10) Patent No.: US 9,530,330 B2
(45) Date of Patent: Dec. 27, 2016

(54) DEVICE FOR VISUALIZING MILITARY OPERATIONS

(71) Applicant: EADS Deutschland GmbH, Munich (DE)

(72) Inventors: Dietmar Vogelmann, Reichertshofen (DE); Martin Foerster, Schmoelln (DE); Martin Koch, Unterschleissheim (DE); Arne Radetzky, Vohburg (DE)

(73) Assignee: Airbus Defence and Space GmbH, Ottobrunn (DE)

( * ) Notice: Subject to any disclaimer, the term of this patent is extended or adjusted under 35 U.S.C. 154(b) by 0 days.

(21) Appl. No.: 13/749,837

(22) Filed: Jan. 25, 2013

(65) Prior Publication Data

US 2014/0065576 A1 Mar. 6, 2014

(30) Foreign Application Priority Data

May 7, 2012 (DE) .......................... 10 2012 008 813

(51) Int. Cl.
*G09B 9/00* (2006.01)
*G09B 5/02* (2006.01)

(52) U.S. Cl.
CPC .................. *G09B 9/003* (2013.01); *G09B 5/02* (2013.01)

(58) Field of Classification Search
CPC ............. G09B 9/00; G09B 9/02; G09B 9/003; G09B 19/00; G09B 5/02
See application file for complete search history.

(56) References Cited

U.S. PATENT DOCUMENTS

| 7,559,834 B1* | 7/2009 | York .................................. 463/2 |
| 8,206,224 B2* | 6/2012 | Farone et al. ................... 463/43 |
| 2003/0091970 A1* | 5/2003 | Fast et al. ....................... 434/322 |
| 2005/0153262 A1* | 7/2005 | Kendir ............................. 434/21 |
| 2009/0106003 A1* | 4/2009 | Diehl ................................. 703/6 |
| 2009/0183123 A1* | 7/2009 | Larsen .......................... 715/841 |
| 2010/0113148 A1 | 5/2010 | Haltovsky et al. |

FOREIGN PATENT DOCUMENTS

DE 40 26 207 A1 2/1992

OTHER PUBLICATIONS

Red Alert.pdf—video game released Oct. 31, 1996.*
Werner Bereiter, The Combat Exercise Simulation System SIRA-BTL: A New Training Tool for the "New Army for New Challenges", pp. 1-14 with Translator's Report/Comment, 1997, (Twenty (20) pages).
German-language International Search Report dated Jan. 10, 2013 with English translation (5 pages).
German-language Written Opinion dated Jan. 10, 2013 with English translation (10 pages).
Australian Patent Examination Report No. 1 issued in Australian counterpart application No. 2013258427 dated May 26, 2016 (Three (3) pages).

* cited by examiner

*Primary Examiner* — Timothy A Musselman
(74) *Attorney, Agent, or Firm* — Crowell & Moring LLP (57) ABSTRACT

A device for visualizing military operations for depicting a scenario for a plurality of action subjects represents each action subject by a representative. The device for visualizing military operations has a memory unit, a first representation unit, and a computing unit. The computing unit is designed to control the first representation unit in such a way that a scenario stored in the memory unit together with the action subjects represented by the representatives are reproduced.

12 Claims, 3 Drawing Sheets

DEVICE FOR VISUALIZING MILITARY OPERATIONS

CROSS-REFERENCE TO RELATED APPLICATIONS

This application claims priority under 35 U.S.C. §119 to German Patent Application No. 10 2012 008 813.2, filed May 7, 2012, the entire disclosure of which is herein expressly incorporated by reference.

FIELD OF THE INVENTION

Exemplary embodiments of the present invention relate to a device for visualizing military operations. In particular, exemplary embodiments of the present invention relate to a device for visualizing military operations for depicting a scenario for a plurality of action subjects, each of the plurality of action subjects being respectively represented by a representative.

TECHNICAL BACKGROUND OF THE INVENTION

Devices for visualizing military operations are used in the course of training armed forces personnel, and also in the analysis and evaluation of military operations that have already occurred and been recorded. In particular for the training of armed forces personnel, a device for visualizing military operations is used for the targeted introduction of the persons to be trained to the tasks and activities that they are to carry out within the scope of a group composed of multiple persons. In this context, a military operation is understood to mean a movement of individual persons and vehicles, weapons, and tools assigned to these persons, as well as the operations performed by these persons. The observed and depicted persons may be combined into one or more fairly small groups of persons having a size of 8 to 15 persons, and/or may involve a composite of these groups of persons.

SUMMARY OF THE INVENTION

Devices for visualizing military operations are used in the training of armed forces personnel, in particular as a prelude to cost- and labor-intensive training, in order to prepare the persons to be trained, with regard to their cognitive knowledge and affective behavior, for the subsequent practical training to the greatest extent possible.

Conventional visualization devices are designed in such a way that the persons to be trained are presented with a situation in a scenario, whereby in the course of a progressive development of a situation or change in a situation, the expected behavior of the participating persons is presented or depicted.

Exemplary embodiments of the present invention are directed to an alternative device for visualizing military operations, which as the result of its design allows improved involvement of the persons to be trained in a situation.

According to a first aspect of the invention, a device for visualizing military operations for depicting a scenario for a plurality of action subjects is provided, wherein each of the plurality of action subjects is respectively represented by a representative. The device for visualizing military operations has a memory unit for storing the scenario, a first representation unit for reproducing the scenario, and a computing unit which is designed to control the first representation unit in such a way that the stored scenario together with the action subjects represented by the representative are reproduced, the scenario having a plurality of scenario objects.

The scenario may be a virtual, computed, configurable, and controllable scenario. However, a recorded scenario of an actual situation development may also be involved.

A virtual scenario involves putting together the environment, the environmental conditions, and acting persons or depictions or representations of acting persons illustrated in the scenario in any given manner, so that any given starting situation and any given situation development may be portrayed.

A computed scenario involves predefined scenario design parameters, and the actual scenario is computed based on the predefined design parameters.

A scenario is configurable when the properties of the objects occurring in the scenario may be adapted, for example to influence a starting situation or a situation development of the scenario. The configured properties of the objects of the scenario may act, for example, during a run time of the scenario depicted on the device for visualizing military operations.

In contrast, a controllable scenario means that the properties of the objects occurring in the scenario are influenceable during the run time of the depicted scenario. The situation development in the scenario may thus be dynamically influenced.

The recording of an actual scenario may have, for example, information concerning the movement of persons and vehicles, whereby this movement information may be requested, for example, in the course of a combat situation or drill situation.

Together with the environmental information and environmental conditions, the movement information together with the corresponding persons and vehicles may be used for reproducing the situation development.

The device for visualizing military operations is designed to image a plurality of action subjects in the scenario, these action subjects corresponding to the portrayed persons. The action subjects are represented by a representative in each case, whereby the representing representative may correspond to a soldier to be trained. In other words, this means that, for example, the movement information of a soldier in a situation is acquired and thus transferred or applied to the action subject associated with this representative, so that the action subject duplicates or carries out the movements and operations of the represented soldier in the depicted scenario.

The memory unit(s) is designed to hold or store the elements of the scenario; i.e., the memory units contain or store, for example, maps of a terrain section or models of artificial environments, as well as properties of objects which are a component of the maps or the modeled environments.

The first representation unit is designed for optical or visual playback of the stored scenario. Of course, the first representation unit may also be designed, for example, to emit acoustic signals or other signals which act on human sensory perception.

The computing unit instructs the first representation unit to reproduce the stored scenario together with the action subjects. In other words, the task of the computing unit is thus to depict the environment provided in the scenario together with the involved action subjects, and to allow the action subjects to interact with the objects that are a component of the scenario.

According to one embodiment, a representative may control a group composed of a plurality of action subjects.

According to one embodiment of the invention, the device for visualizing military operations has a plurality of input units. Each input unit is designed to transmit control signals to the computing unit, the computing unit being designed to control an action subject in the scenario, associated with an input unit, corresponding to the control signals of this input unit.

The input unit allows a representative or a person to influence the action subject in the scenario which is associated with a certain input unit.

In other words, this means that a representative or a person to be trained controls a certain action subject via the input unit.

The association of an input unit with a certain action subject in the scenario may be made by means of a colored code, for example, a color of the input unit corresponding to a color of the action subject associated with this input unit.

Thus, the device for visualizing military operations as described above and explained below allows a representative of an action subject, via the input unit, to actively prompt this action subject in the depicted scenario to perform an operation, resulting in reinforcement of the expected behavior in a situation for the representative.

The device for visualizing military operations as described above and explained below may in particular be designed in such a way that all representatives are provided with a shared image or a shared view of the depicted scenario.

According to another embodiment of the invention, the plurality of scenario objects has a first group of fixed objects and a second group of movable objects.

The fixed objects are, for example, immovable objects such as trees, houses, or other infrastructure components of a terrain or section of an environment, such as streets, bridges, rivers, or general geographical or vegetative properties of a terrain or a terrain section.

The movable objects are mobile objects that are part of the situation depicted in the scenario. In a military drill scenario, for example, these are persons and vehicles of the armed forces depicted as adversaries, as well as uninvolved persons and their vehicles.

The first group of fixed objects is characterized in that its properties or its behavior result(s) from the data upon which the scenario is based. In other words, this means that the representatives can have no direct influence on the fixed objects, but are able to indirectly influence the first group of fixed objects by their own actions and the control of the action subjects assigned to them.

According to another embodiment of the invention, the first group of fixed objects has predefined objects or freely configurable objects.

This means that the predefined objects are accepted into the scenario without modification of their properties, and the freely configurable objects are changeable with regard to their properties. For example, a building represents a freely configurable object, whereby the dimensions and the appearance of the building may be freely configured.

The objects of the first group of fixed objects are used, for example, in creating any given modeled scenario and also in reproducing an actual terrain section, so that a military operation may be depicted in the scenario thus created.

According to another embodiment of the invention, the second group of movable objects has action subjects and action objects.

The action subjects are the action subjects in the scenario which are represented by the representatives.

The action objects are scenario objects on which or with which the action subjects may carry out or complete operations.

An action object could be a vehicle, a weapon, or some other item of military equipment, for example. For example, an action subject may take over the control of the vehicle, or deploy the weapon or some item of military equipment, for the purpose for which it is provided. In particular, it is noted that an action object may be used only if an action subject in the scenario has spatial access to the action object; i.e., for example a vehicle may be moved only if an action subject represented by a representative is present in the vehicle and operates this vehicle.

According to another embodiment of the invention, the device for visualizing military operations has an interface for receiving movement information concerning an actual object, the movement information corresponding to a movement of a person or a vehicle, wherein the computing unit is designed to accept the movement information and control an action object or action subject in the scenario associated with the actual object.

As described in detail above, the interface is used for receiving movement information concerning actual objects, in particular for depicting situation developments that have actually occurred, in order to make this information available for evaluation and analysis.

According to another embodiment, the computing unit is designed for simultaneously reproducing a first scenario and a second scenario on the first representation unit.

Thus, for example, a first situation development and a second situation development may be depicted in the same terrain, this depiction being suited for displaying different progressions of the first situation development and of the second situation development. In other words, this involves the simultaneous reproduction of the movable objects in a first scenario and in a second scenario, the fixed objects in each case being the same; i.e., two scenarios of movable objects are to be depicted in the same environment.

According to another embodiment, the computing unit is designed to reproduce the scenario in a variable representation sequence on the first representation unit.

This means that in the event of errors by the representatives or action subjects, the situation development in a scenario may be halted. It is also possible to skip to any given past point in time of the situation development in the scenario. It is thus possible to select this skip time in such a way that the action subjects repeat or continue the situation development beginning at a point in time when the error has not yet occurred.

This requires that the memory unit is designed to record and store the situation development of the scenario, so that a skip may be made to any given point in time in the depiction of the scenario. Of course, in a recorded scenario a skip may be made to a past point in time as well as to a future point in time, starting from the point in time in the scenario depicted at that moment.

It is of particular importance that for a skip to a past point in time and for a continuation of the situation development, the action subjects are able to assume an alternative path of action or an alternative behavior.

According to another embodiment, the device for visualizing military operations has a second representation unit which is designed to illustrate the depicted scenario from a viewing angle that is different from the viewing angle of the first representation unit.

The second representation unit may be provided, for example, for an operator of the device for visualizing military operations, the second representation unit having expanded display characteristics, so that, for example, scenario objects are depicted on the second representation unit that is not depicted on the first representation unit.

According to another embodiment, the device for visualizing military operations has a configuration unit, the configuration unit being designed to configure a design of the scenario.

This means that a scenario may be created by means of the configuration unit, whereby the scenario may be a modeled environment or a reproduction of an actually existing terrain section. The configuration unit is designed so that the freely configurable objects and the movable objects may be configured and placed in the scenario. In addition, the fixed objects may be merely placed in the scenario.

The freely configurable objects may be, for example, explosive devices that have the property of a distance-dependent detonation mechanism that deploys when an action subject in the scenario approaches the explosive device over the indicated distance. In addition, such a scenario object could have the property of a so-called detection distance that indicates the distance at which an action subject in the scenario is able to detect and identify the explosive device. Thus, for example, the stated explosive device would not be visible on the first representation unit until an action subject is present within the detection distance from the explosive device, and at the same time the viewing direction is directed toward the explosive device.

For example, the behavior of the opposing armed forces depicted in the scenario may be influenced via the configuration unit.

BRIEF DESCRIPTION OF THE DRAWING FIGURES

Exemplary embodiments of the invention are explained in greater detail below with reference to the appended drawings, which show the following.

DETAILED DESCRIPTION OF THE EXEMPLARY EMBODIMENTS

Figure 1:
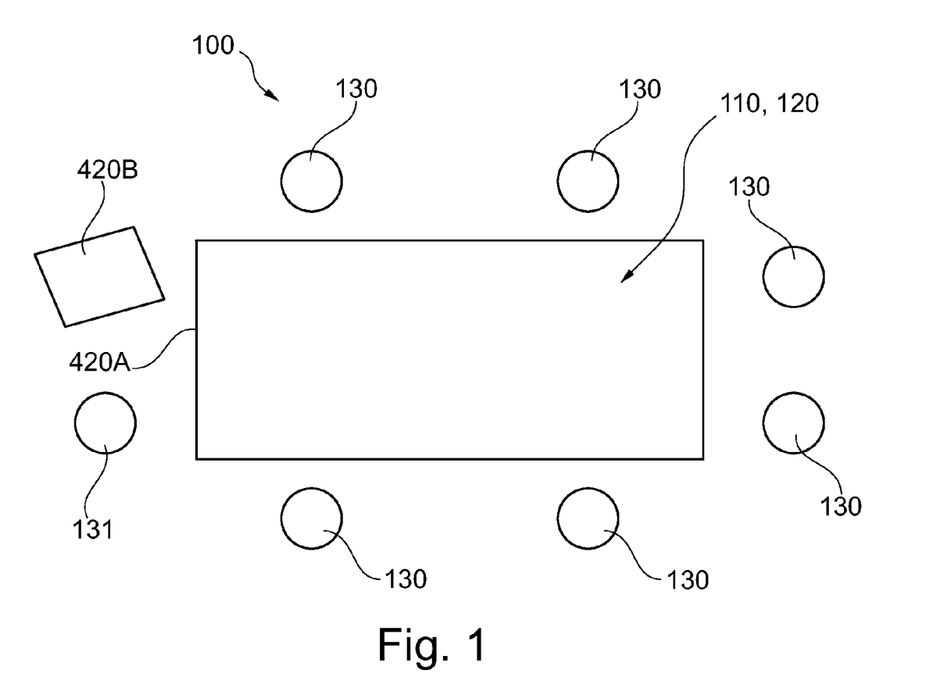
FIG. 1 shows a schematic top view of a device for visualizing military operations according to one exemplary embodiment of the invention.

FIG. 1 shows a device 100 for visualizing military operations, having a first representation unit 420A and a second representation unit 420B.

The first representation unit 420A is designed to depict a scenario 110 that contains a plurality of action subjects 120. In addition, the scenario 110 has a plurality of fixed objects and a plurality of movable objects.

The first representation unit 420A may be a horizontally oriented image playback unit. The image playback unit may be a projection surface, for example, which is illuminated with the appropriate light signals by means of an image projector. Furthermore, the first representation unit 420A may be any other given device for depicting and playing back video signals, for example a monitor.

The representatives 130 of the action subjects 120 in the scenario 110 are situated at the periphery of the first representation unit 420A in such a way that all representatives 130 are able to view the scenario 110 that is depicted on the first representation unit 420A.

Although FIG. 1 shows six representatives 130, the device for visualizing military operations as described above and explained below may be designed for more or fewer than six representatives.

The second representation unit 420B may show the same scenario 110 that is shown by the first representation unit 420A; however, the scenario 110 on the first representation unit may be depicted from a different viewing angle than the scenario on the second representation unit. Thus, for example, a top view of the scenario may be shown on the first representation unit 420A, and a perspective view of the scenario may be shown on the second representation unit 420B.

Likewise, the second representation unit 420B may have a control area or a configuration unit, via which an operator 131 of the device for visualizing military operations may control or configure this device.

Figure 2:
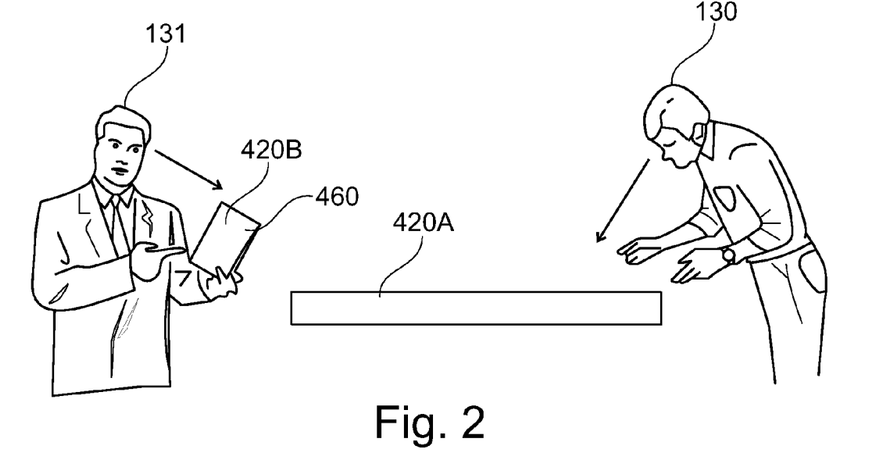
FIG. 2 shows a schematic side view of a device for visualizing military operations according to another exemplary embodiment of the invention.

FIG. 2 shows a side view of a device for visualizing military operations, only one representative 130 and one operator 131 being illustrated for improved clarity.

The operator 131 observes the depicted scenario via the second representation unit 420B, the viewing direction of the operator 131 onto the second representation unit being indicated by an arrow.

It is pointed out that the operator 131 may view the scenario on the first representation unit as well as on the second representation unit. In particular, the second representation unit may be designed in such a way that it contains the configuration unit 460, so that the scenario may be configured and controlled via the second representation unit and the configuration unit.

It is also apparent from FIG. 2 that the second representation unit 420B has an area that contains the configuration unit 460. This configuration unit 460 may, for example, be a touch-sensitive area of a monitor, whereby data and control signals may be transmitted and input to the device for visualizing military operations via this touch-sensitive area.

The second representation unit 420B may be a portable monitor or computer, or a stationary monitor, as shown in FIG. 2 and FIG. 1, respectively.

The first representation unit 420A is horizontally oriented, and is situated at a distance of approximately 50 cm to 150 cm from the eyes of the representative 130. This distance ensures that each representative 130 is able to view the entire area of the display surface of the first representation unit 420A.

Figure 3:
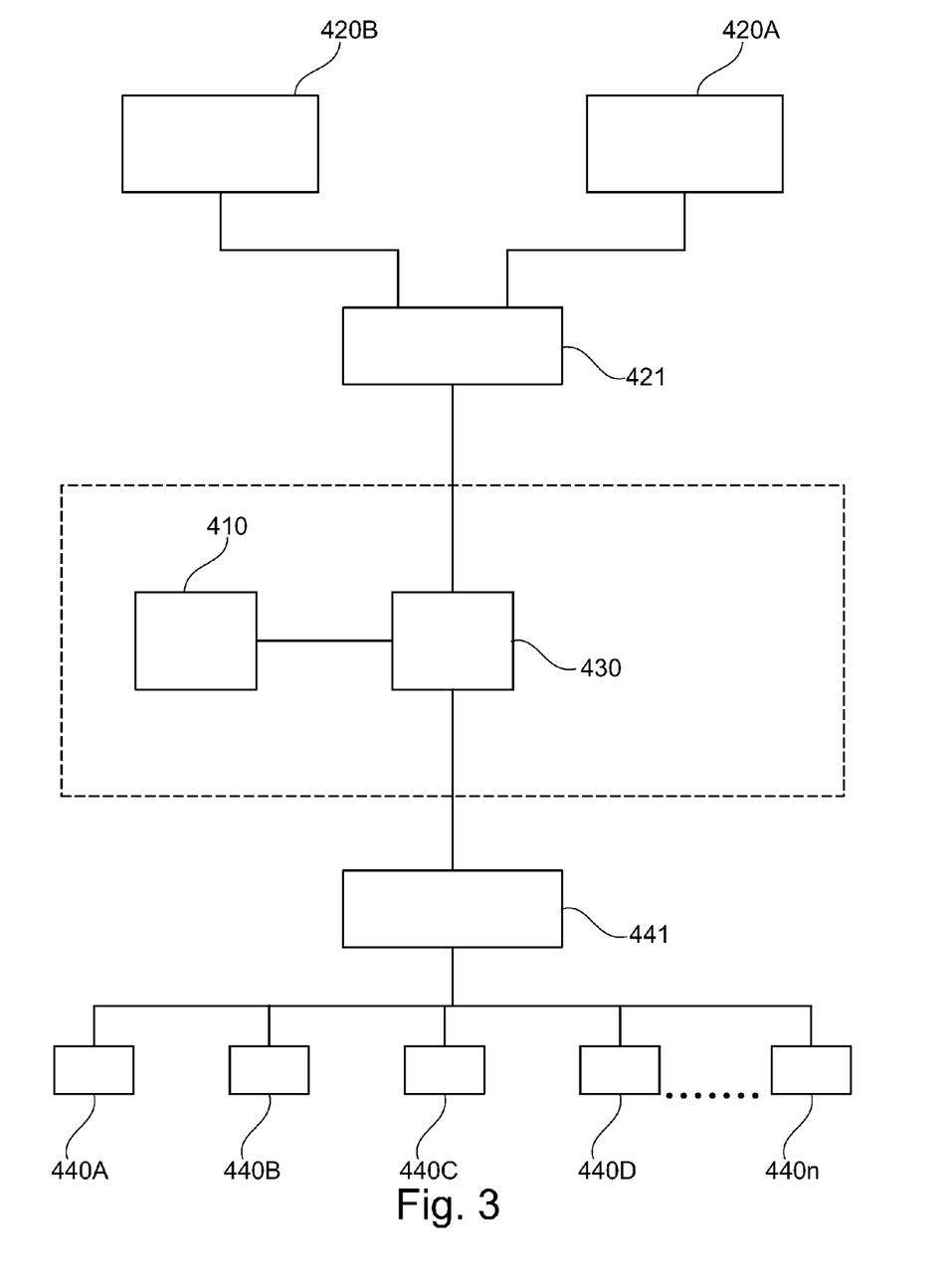
FIG. 3 shows a schematic view of the components of a device for visualizing military operations according to another exemplary embodiment of the invention.

FIG. 3 shows the structural design of a device for visualizing military operations.

The first representation unit 420A and the second representation unit 420B are connected to the computing unit 430 via a representation adapter 421. In addition, a plurality of input devices or input units 440A, 440B, 440C, 440D to 440n is connected to the computing unit 430 via an input adapter 441.

The computing unit 430 thus accepts control signals from the input units and instructs the first representation unit and the second representation unit to reproduce the scenario. For this purpose, the computing unit accesses the memory unit 410 in order to read the scenario and the objects and action subjects contained therein, and depict same on the representation units.

Figure 4:
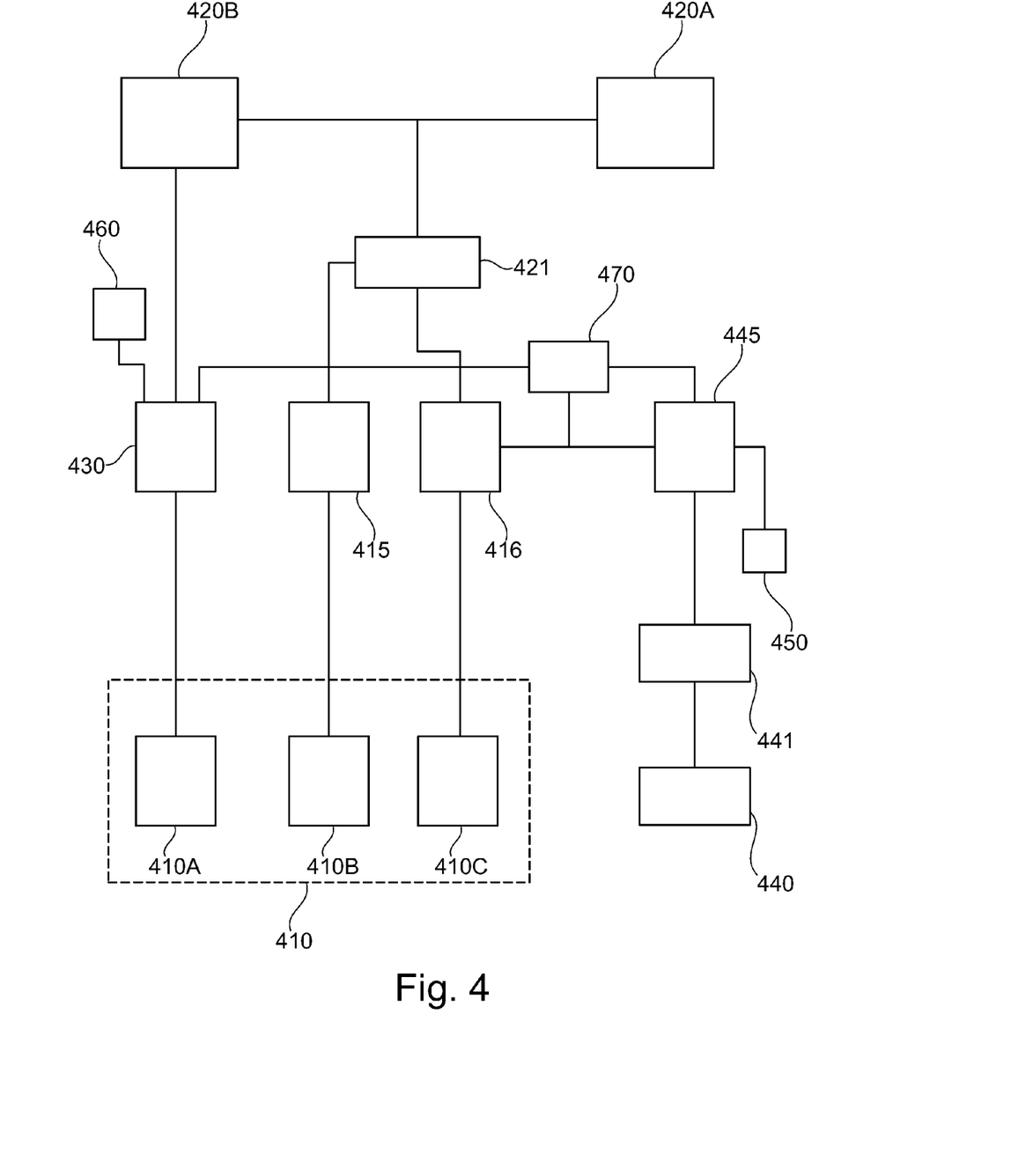
FIG. 4 shows a schematic view of the components of a device for visualizing military operations according to another exemplary embodiment of the invention.

FIG. 4 shows a schematic illustration of the design and interaction of the components of a device for visualizing military operations according to one exemplary embodiment of the invention.

The memory unit 410 has a first memory component 410A that is designed to store the configuration of a scenario, such as the number, position, and properties of the movable objects.

The second memory component 410B is designed to store the imaged or modeled environment of a scenario such as maps and/or terrain information.

The third memory component 410C is designed to store state information of a scenario so that the execution of a scenario may be replayed, or an alternative path of action may be taken in an executed scenario, as described in greater detail below.

The first memory component 410A contains the description of the dynamic and movable parts or objects of the scenario. Thus, the first memory component 410A contains, for example, the number and the properties of the scenario objects which may be configured via the configuration unit 460 by an operator of the device for visualizing military operations. These scenario objects are configured via the configuration unit 460, which is connected to the computing unit 430, the configured objects being stored or deposited in the first memory component 410A by the computing unit 430. The configuration unit 460 may be designed as an independent component and be connected to the computing unit 430, but may also be designed as part of the second representation unit 420B, in which case the scenario objects which are stored in the first memory component 410A are configured via the second representation unit 420B. This is illustrated in FIG. 4 in that the second representation unit 420B is connected to the computing unit 430.

The second memory component 410B contains predefined scenario objects whose properties may be set prior to the run time of the device for visualizing military operations, and which cannot be altered during the run time. Terrain information and environmental parameters are thus stored in the second memory component.

The environment is generated by the synthesis unit 415 from the set of predefined scenario objects in the second memory component 410B. Thus, for example, the set of predefined scenario objects may contain a house, a street, or vegetation such as trees, and more complex structures are created by the synthesis unit 415 based on these individual objects within the scope of the scenario synthesis. Thus, an entire community having a complex road network may be created or synthesized from an individual house or a street object. Similarly, an entire forest may be created from an individual tree, taking the geographical circumstances, such as the tree line in mountainous terrain, into account.

In other words, the scenario unit 415 is designed to generate a complex environment from a few predefined individual objects. In a modeled environment these data represent the facade or the background.

The synthesis unit 415 is connected to the representation adapter 421, whereby the representation adapter 421 receives the information concerning the modeled environment from the synthesis unit 415 and transmits same to the first representation unit 420A and to the second representation unit 420B.

The computing unit 430 is also designed to transfer the scenario objects from the first memory component 410A to a behavior simulation unit 445. The behavior simulation unit 445 is designed to compute the movements and actions of the movable scenario objects, which may be the depicted or simulated persons and vehicles of the opposing armed forces.

In addition, the behavior simulation unit 445 is designed to receive control signals of the input unit 440 via the input adapter 441, and to accept movement information via the interface 450.

In other words, the movement and the behavior of the active objects in the scenario are computed in the behavior simulation unit 445.

The behavior simulation unit 445 transmits the computed behavior information to the state recording unit 416, which keeps a state vector or status vector of the overall scenario. This state vector contains the properties for each object of the scenario at a given point in time t.

For a vehicle depicted in the scenario, the state vector could indicate, for example, the vehicle's position, direction of motion, and speed. For a person depicted in the scenario, the state vector could likewise have values for the person's position, direction of motion, speed, armaments, or state of health.

The behavior simulation unit 445 is designed to recompute the state vector of the scenario after a certain period of time, this recomputation corresponding to the further development of the scenario or the situation. Such a recomputation of the state vector may be made at uniform time intervals, for example 20 to 30 times per second.

To be able to replay a depicted scenario at any given later point in time, the state vector is stored in the third memory component 410C.

Compression techniques may be used for storing the state vector, so that, for example, only the rows of the state vector that have changed in comparison to the previous value are stored. Likewise, components of the state vector may be stored using interpolation techniques such as linear interpolation, so that the memory requirements for the state vectors are kept low.

The state recording unit 416, the same as the synthesis unit 415, is connected to the representation adapter 421, whereby the representation adapter 421 is responsible for converting the data provided by the synthesis unit 415 and the state recording unit 416 into corresponding signals for optical display by the representation units 420A, 420B.

The time control unit 470 is designed to determine the state vector that is transferred from the state recording unit 416 to the representation adapter 421. Thus, for example, in a first case the state vector of a running scenario is transferred to the representation adapter, this state vector directly having the properties of the objects of the depicted scenario, and the action subjects being controlled via the input units 440. In a second case, the values of the state vector may be loaded from the third memory component 410C into the state recording unit 416, this corresponding to the playback of a recorded scenario.

The time control unit 470 is controlled via the computing unit 430. In particular, this control is carried out according to instructions to the computing unit which are entered via the control unit 460.

The time control unit 470 may also be designed to load the state vector of a recorded scenario from the third memory component 410C, so that this scenario is replayed on the representation units until a certain point in time, and whereby beginning at any given point in time of a recorded scenario a targeted selection of action subjects, for example, may be made, and these selected action subjects are assigned to the control by a representative via an input unit 440.

The targeted selection and assignment of an action subject to a representative thus allows a scenario to be depicted as it was recorded, but beginning at a specified point in time in the scenario the selected action subject takes an alternative path of action, i.e., is controlled by a representative. This means that the values of the selected action subject are not read from the state vector, but, rather, the operations and movements of the action subject are predefined by the representative via the input unit 440, the remaining scenario objects and their behavior being read from the state vector.

Thus, in a scenario that is recorded and later replayed, it is possible for scenario objects to be determined and selected whose behavior beginning at a specified point in time t, wherein the point in time t corresponds to a time between the start and the end of the recorded scenario, is read not from the recorded state vectors, but, rather, corresponds to the control signals that are input via the input units. The objects and action subjects that are not selected behave according to the values stored in the state vector.

Of course, a plurality of action subjects in a recorded scenario may be selected for taking an alternative path of action, in which case all selected action subjects exhibit a path of action that differs from the recorded state vector.

It is pointed out that the computing unit 430, the synthesis unit 415, the state recording unit 416, the behavior simulation unit 445, and the time control unit 470 may be constituents or functional components of a separate computing unit.

In one exemplary embodiment, the device for visualizing military operations described above and explained below may be used for training military land forces. In particular, the interaction of multiple individual soldiers and their cooperation using vehicles are practiced.

The device for visualizing military operations allows an active integration of the soldiers to be trained into the situation depicted in the scenario, resulting in reinforcement of the affective operations of the soldiers in a given combat or drill situation. The preparations of the soldiers for the labor- and cost-intensive training segments in the field may be significantly improved using the device for visualizing military operations described above and explained below, so that the scope of the cost-intensive training segments may be abbreviated if necessary.

The device for visualizing military operations as described above and explained below allows a soldier to be trained to be confronted with a number of situations and quickly changing combat scenarios and threatening situations, whereby, as a result of the direct assignment to an action subject, the soldiers to be trained are prompted to perform active operations in the scenario, so that modes and patterns of behavior in the soldiers to be trained may be instilled and reinforced.

The second representation unit and the configuration unit are provided for the trainer of the soldiers to be trained, the trainer observing the situation development, and, for example, being able to influence the behavior of the opposing armed forces depicted in the scenario. Likewise, the trainer is able to halt the situation development via the configuration unit and the second representation unit, for example after identifying an error or incorrect behavior of the soldiers to be trained, and to reset the situation development to any given past point in time so that the soldiers to be trained have the opportunity to take an alternative path of action with their assigned action subjects. The option for immediate feedback and evaluation of the training progress results in greatly improved training, and a training result that is achieved more quickly.

In particular in tactically demanding situations that require a high level of understanding of the overall context of a situation or of a scenario, the device for visualizing military operations as described above and explained below makes it possible for the soldiers to be trained, without physical stress or interfering environmental influences, to focus completely on the situation and still perform necessary operations in order to control, or prompt an action, of the subject assigned to them in the situation or scenario.

In one exemplary embodiment, the device for visualizing military operations has at least three and at most twelve input units. Thus, three to twelve soldiers may be simultaneously trained in a tactical situation. The soldiers to be trained share the view or vision of the scenario depicted on the first representation unit. The first representation unit may be a horizontally oriented projection surface or image display device. Each soldier to be trained is assigned a fixed position with respect to the horizontally oriented first representation unit. The first representation unit may be designed to provide each soldier with an individual viewing perspective on a section of the first representation unit in addition to the shared view of the overall scenario, the individual viewing perspective of each of the soldiers to be trained providing a view of the scenario based on the action subject assigned to this soldier, taking the viewing direction of the action subject into account.

Thus, in this use of the device for visualizing military operations by way of example, the step of theoretical instruction in the operations to be carried out for the training of soldiers in the field may be shortened, or an intermediate step may be incorporated in which the soldiers have the opportunity to perform the required operations in the tactical context without physical stress.

What is claimed is:

1. A device for visualizing military operations for depicting a scenario for a plurality of action subjects, each of the plurality of action subjects being respectively controlled by a representative, wherein the device for visualizing military operations comprises:
    a first memory unit configured to store the scenario;
    a first representation unit configured to represent the stored scenario; and
    a computing unit configured to control the first representation unit in such a way that the stored scenario, including a plurality of moveable and fixed scenario objects, together with the action subjects controlled by the plurality of representatives are reproduced on the first representation unit, wherein the reproduction on the first representation unit occurs over time with the moveable scenario objects and the action subjects moving over the time of the reproduction and movement of the moveable scenario objects being controlled by the device,
    wherein the first representation unit is a shared representation unit for the plurality of representatives such that all representatives being part of the visualized military operation are able to view the scenario depicted on the first representation unit;
    a plurality of input units,
        wherein each of the plurality of input units is configured to transmit control signals to the computing unit, wherein the computing unit is configured to control an action subject in the scenario, associated with an input unit, corresponding to the control signals of the associated input, and wherein each of the plurality of input units is configured to control at least one moveable object displayed on the shared representation unit;

a second memory unit configured to store a plurality of state vectors, wherein each of the plurality of state vectors contains properties of the moveable scenario objects at a particular time during the reproduction;

a configuration unit configured to receive an instruction to replay the reproduction at a specified time and an assignment of one of the plurality of moveable objects to one of the plurality of representatives, wherein in response to receipt of the instruction the computing unit retrieves a first state vector of the plurality of state vectors corresponding to the specified period of time; and the computing unit controls during the replay reproduction of the stored scenario on the first representation unit starting from the specified period of time over a remaining period of the time of the reproduction using the stored plurality of state vectors to control reproduction of all the moveable scenario objects for at least a portion of the reproduction, control instructions, received during the reproduction, corresponding to an assignment of one of the plurality of moveable objects to one of the plurality of representatives, for the reproduction of the moveable object assigned to the one of the plurality of representatives, wherein, in response to the assignment of the one of the plurality of moveable objects, the stored plurality of state vectors cease to be used by the computing unit to control the reproduction of the assigned moveable object, whereby control of the reproduction of the assigned moveable object is carried out thereafter in accordance with the control instructions.

2. The device for visualizing military operations according to claim 1, wherein the fixed scenario objects include predefined objects or freely configurable objects.

3. The device for visualizing military operations according to claim 1, further comprising:

an interface configured to receive information concerning movement of an actual object, wherein the movement information corresponds to a movement of a person or a vehicle, wherein the computing unit is configured to record the movement information and control an action object or action subject in the scenario that is associated with the actual object.

4. The device for visualizing military operations according to claim 1, wherein the computing unit is configured to simultaneously reproduce a first scenario and a second scenario on the first representation unit.

5. The device for visualizing military operations according to claim 1, further comprising:

a second representation unit, wherein the second representation unit is configured to depict the scenario from a viewing angle that is different from a viewing angle of the first representation unit.

6. The device for visualizing military operations according to claim 1, wherein the configuration unit is arranged to configure a design of the scenario.

7. A method for visualizing military operations for depicting a scenario for a plurality of action subjects, each of the plurality of action subjects being respectively controlled by a representative, the method comprising:

storing the scenario in a memory unit;

representing the stored scenario on a first representation unit;

controlling, by a computing unit, the first representation unit in such a way that the stored scenario, including a plurality of moveable and fixed scenario objects, together with the action subjects controlled by the plurality of representatives are reproduced on the first representation unit, wherein the reproduction on the first representation unit occurs over time with the moveable scenario objects and the action subjects moving over the time of the reproduction and movement of the moveable scenario objects being controlled by the computing unit, wherein the first representation unit is a shared representation unit for the plurality of representatives such that all representatives being part of the visualized military operation are able to view the scenario depicted on the first representation unit;

receiving, by the computing unit, control signals from each of a plurality of input units;

controlling, by the computing unit, an action subject in the scenario, associated with an input unit, corresponding to the control signals of the associated input unit;

controlling, by each of the plurality of input units, at least one moveable object displayed on the shared representation unit;

storing a plurality of state vectors, wherein each of the plurality of state vectors contains properties of the moveable scenario objects at a particular time during the reproduction;

receiving an instruction to replay the reproduction at a specified time and an assignment of one of the plurality of moveable objects to one of the plurality of representatives, wherein in response to receipt of the instruction a first state vector of the plurality of state vectors corresponding to the specified period of time is retrieved;

the stored scenario is reproduced on the first representation unit starting from the specified period of time over a remaining period of the time of the reproduction using the stored plurality of state vectors to control reproduction of all the moveable scenario objects at least for a portion of the reproduction, control instructions, received during the reproduction, corresponding to an assignment of one of the plurality of moveable objects to one of the plurality of representatives, for the reproduction of the moveable object assigned to the one of the plurality of representatives, wherein, in response to the assignment of the one of the plurality of moveable objects, the stored plurality of state vectors cease to be used by the computing unit to control the reproduction of the assigned moveable object, whereby control of the reproduction of the assigned moveable object is carried out thereafter in accordance with the control instructions, wherein the first representation unit is a shared representation unit for the multiple representatives such that all representatives being part of the military operation are able to view a scenario depicted on the first representation unit.

8. The method according to claim 7, wherein the fixed scenario objects include predefined objects or freely configurable objects.

9. The method according to claim 7, further comprising:
receiving, by an interface, receive information concerning movement of an actual object,
wherein the movement information corresponds to a movement of a person or a vehicle,
wherein the computing unit is configured to record the movement information and control an action object or action subject in the scenario that is associated with the actual object.

10. The method according to claim 7, wherein the computing unit simultaneously reproduces a first scenario and a second scenario on the first representation unit.

11. The method according to claim 7, further comprising:
depicting, by a second representation unit, the scenario from a viewing angle that is different from a viewing angle of the first representation unit.

12. The method according to claim 7, further comprising:
configuring, by a configuration unit, a design of the scenario.

* * * * *